(12) United States Patent
Byers et al.

(10) Patent No.: US 6,592,148 B2
(45) Date of Patent: Jul. 15, 2003

(54) STEERING COLUMN LOWER BRACKET

(75) Inventors: David Michael Byers, Saginaw, MI (US); Richard Kremer Riefe, Saginaw, MI (US); James Salois, Midland, MI (US); Michael John Clayton, Saginaw, MI (US); Marc William Heinzman, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/898,947

(22) Filed: Jul. 3, 2001

(65) Prior Publication Data

US 2003/0006601 A1 Jan. 9, 2003

(51) Int. Cl.⁷ .................................................. B62D 1/19
(52) U.S. Cl. .......................... 280/777; 280/779; 74/492
(58) Field of Search ................................ 280/777, 779; 74/492; 188/371, 374

(56) References Cited

U.S. PATENT DOCUMENTS

| | | | | | |
|---|---|---|---|---|---|
| 5,669,634 | A | * | 9/1997 | Heinzman et al. | 280/777 |
| 5,706,704 | A | * | 1/1998 | Riefe et al. | 280/777 |
| 5,788,278 | A | * | 8/1998 | Thomas et al. | 280/777 |
| 6,435,555 | B1 | * | 8/2002 | Seamon et al. | 280/777 |

\* cited by examiner

*Primary Examiner*—Peter C. English
(74) *Attorney, Agent, or Firm*—Edmund P. Anderson

(57) ABSTRACT

The lower bracket assembly for a vehicle steering column includes a lower column support bracket with a central passage. A lower bearing adapter slides into the central passage from the rear. A pair of energy absorption straps engage the column support bracket and the lower bearing adapter and resist further forward movement of the lower bearing adapter. During a collision, the energy absorption straps absorb energy while permitting the lower bearing adapter to move forward and out of the central passage through the column support bracket.

26 Claims, 4 Drawing Sheets

STEERING COLUMN LOWER BRACKET

TECHNICAL FIELD

The steering column lower bracket assembly supports a column lower end, incorporates an energy absorption system and snaps together.

BACKGROUND OF THE INVENTION

Steering columns assemblies for vehicles are available that collapse during a collision. Energy absorption systems are used with collapsible columns. These energy absorption systems cooperate with airbags to minimize the force exerted on a vehicle driver during a collision.

Current steering column energy absorption systems employ a large high strength jacket assembly and include multiple column pieces that are secured in place by threaded fasteners. These columns tend to be large and occupy a substantial area between a vehicle dash and a fire wall. Their weight is substantial. Energy absorption straps, employed in many energy absorption systems, are expensive. Assembly with multiple threaded fasteners is labor intensive, physically taxing and time consuming. Repetitive motion injuries are a potential problem during assembly operations.

Repair of current steering columns, following a collision, is expensive and time consuming. Many columns must be at least partially disassembled to inspect energy absorption system components and to replace expensive energy absorption straps. Parts which were not damaged during a collision may be damaged during disassembly and reassembly. Threaded fasteners with locking features may require replacement once they have been removed. Special tools may be required for steering column assembly and disassembly. If the total cost of repairing a vehicle is too expensive due in part to both the time required to repair a steering column and the cost of parts to repair a steering column, the entire vehicle may be scraped rather than repaired.

SUMMARY OF THE INVENTION

The steering column lower bracket assembly includes a lower bearing adapter. The lower bearing adapter has a bearing pocket, a steering shaft passage and a bight forming surface. A steering column jacket is in engagement with the lower bearing adapter. A lower column support bracket includes a central passage that telescopically receives the lower bearing adapter and limits radial movement of the lower bearing adapter relative to the central passage. An energy absorbing strap has an anchor end anchored to the lower column support bracket and a bight portion in engagement with the bight forming surface. The energy absorbing strap resists axial movement, to the front, of the lower bearing adapter relative to the central passage through the lower column support bracket.

BRIEF DESCRIPTION OF THE DRAWINGS

Presently preferred embodiments of the invention are disclosed in the following description and in the accompanying drawings, wherein.

DESCRIPTION OF THE PREFERRED EMBODIMENT

Figure 1:
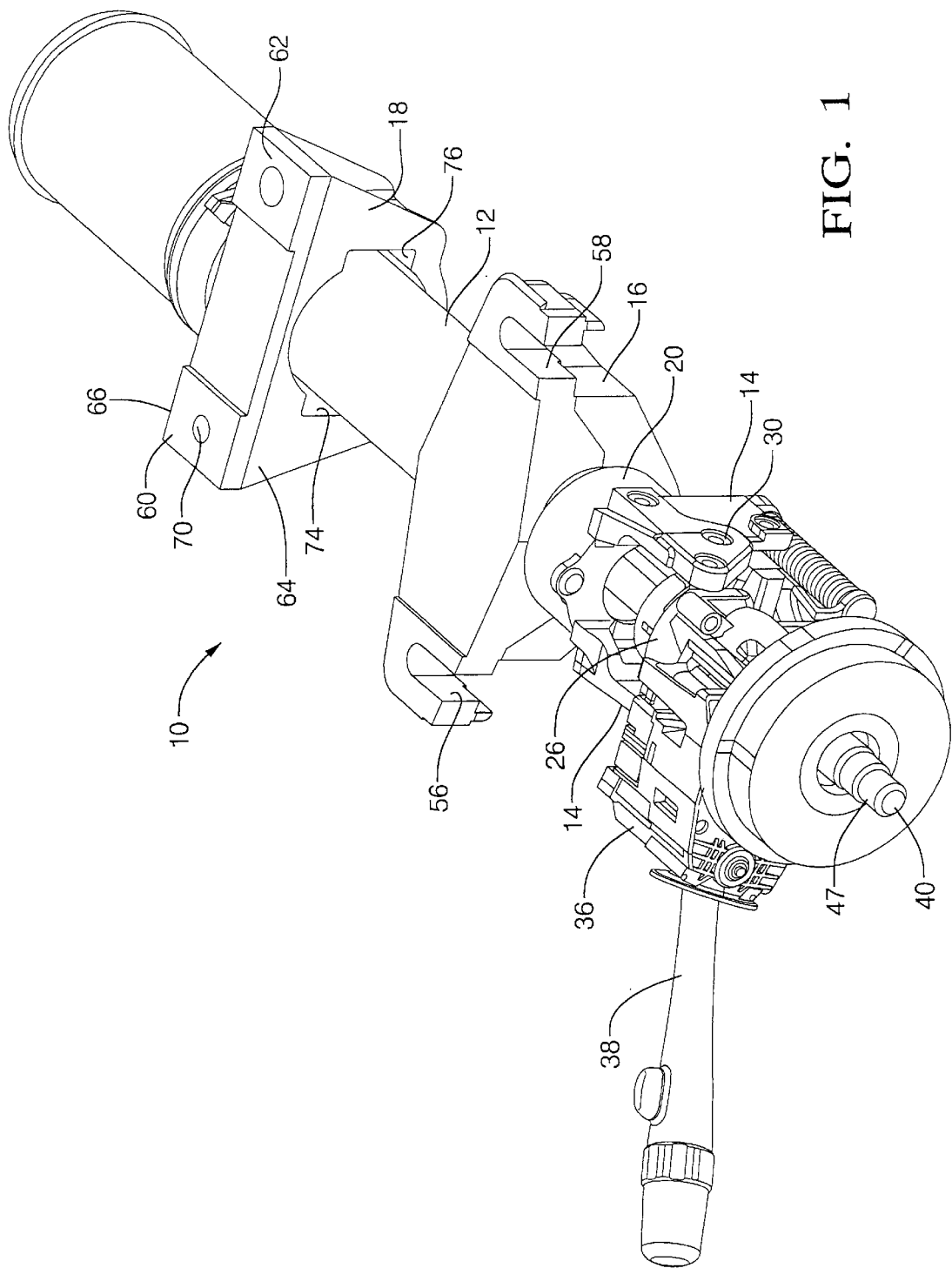
FIG. 1 is a perspective view of vehicle steering column with a lower support bracket.
Figure 2:
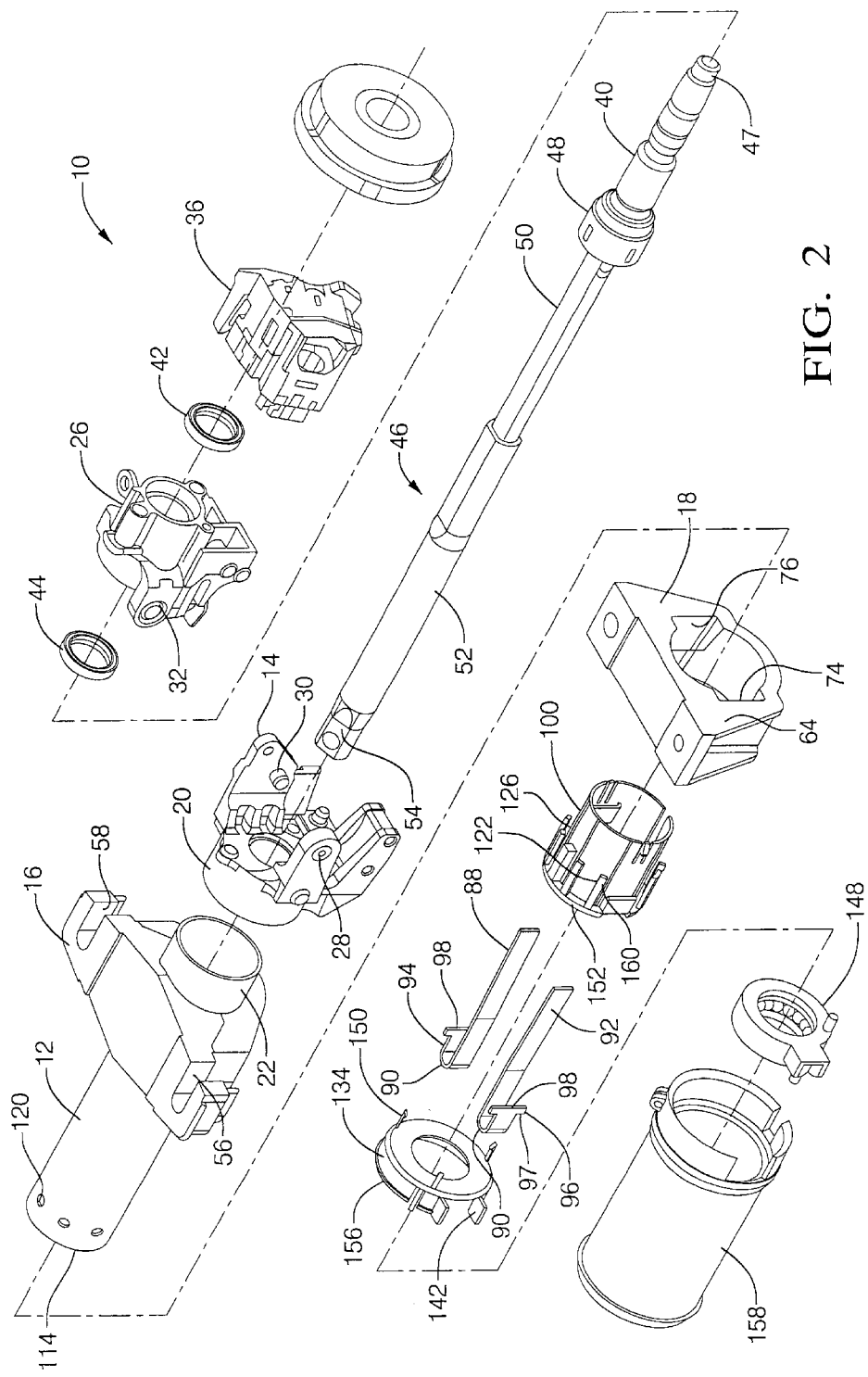
FIG. 2 is an expanded view of the vehicle steering column.
Figure 3:
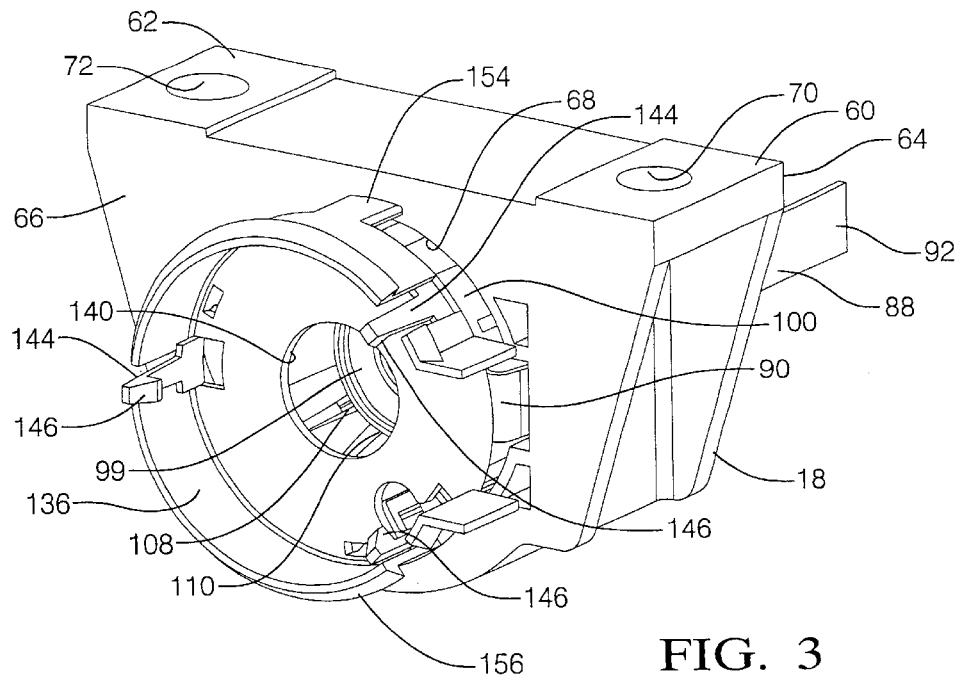
FIG. 3 is an enlarged perspective view of the lower end of the lower column support bracket, the lower bearing adapter and one of the two energy absorption straps.
Figure 4:
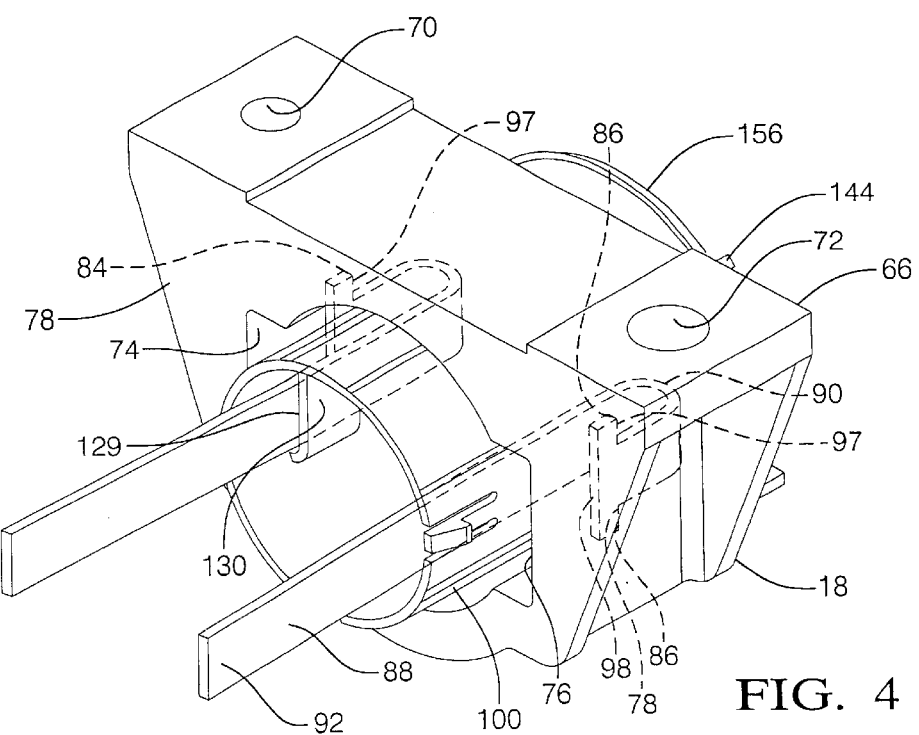
FIG. 4 is an enlarged perspective view of the upper end of the lower column support bracket, the lower bearing adapter and the two energy absorption straps.
Figure 5:
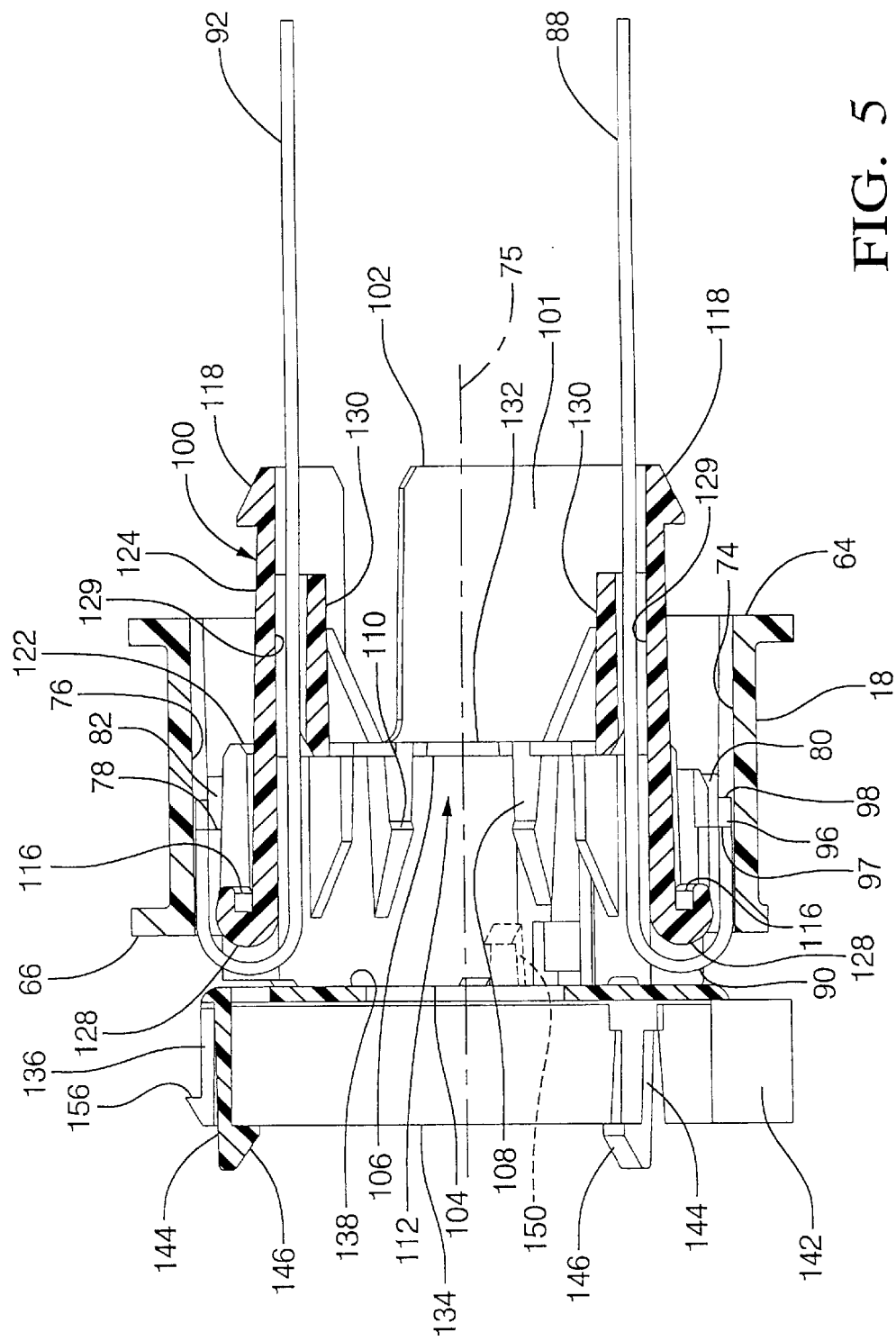
FIG. 5 is a sectional view of the lower column support bracket and the lower bearing adapter as shown in FIG. 4, with the energy absorption straps in full lines, taken along a generally horizontal plane including the intermediate steering shaft axis and looking downward.

The vehicle steering column 10, shown in FIGS. 1 and 2, includes an upper column jacket 12, a yoke 14 attached to the upper end of the upper column jacket, an upper column support bracket 16 and a lower column support bracket 18. A tubular portion 20 of the yoke 14 telescopically receives a tubular portion 22 of the upper column jacket 12 and retains the yoke on the upper column jacket.

A steering tilt housing 26 is pivotally attached to the yoke 14 by pivot pins 28 and 30 that are received in a pair of pin bores 32 in the tilt housing. An electrical control housing 36 is secured to the tilt housing 26. The control housing 36 controls the windshield wipers, windshield washer, turn signals and headlights. These control functions are activated by a control arm 38 that is received in the control housing 36.

An upper steering shaft 40 is journaled in the tilt housing 26 by bearings 42 and 44. A steering wheel (not shown) is clamped to the free end 47 of the upper steering shaft 40. An intermediate steering shaft 46 is connected to the upper steering shaft 40 by a universal joint 48. The intermediate steering shaft 46 includes a solid shaft 50 that is telescopically received in a tubular steering shaft 52. During collapse of the steering column 10, the intermediate steering shaft 46 will normally not collapse, by the solid shaft 50 moving further into the tubular steering shaft 52. The lower steering shaft (not shown) connected to the lower end 54 of the tubular shaft 52, either collapses or moves out of the way.

The upper column support bracket 16 is an integral part of the upper column jacket 12 as shown in the drawing. The support bracket 16 could also be a separate member that is secured to the tubular upper jacket 12. Two slots 56 and 58 in the upper column support bracket 16 received fasteners that clamps the support bracket to a vehicle. In the event of a collision, forward pressure on the steering column 10 will separate the support bracket 16 from fasteners in the slots 56 and 58. Once these fasteners holding the upper bracket 16 separate from the support bracket, the upper end of the steering column 10 is held in place by the lower support bracket 18.

The lower support bracket 18 has clamping surfaces 60 and 62, rearward facing surface 64, forward facing surface 66 and a central passage 68. Fastener passages 70 and 72 are provided for bolts that clamp the clamping surfaces 60 and 62 to a vehicle frame or to a vehicle body frame. The lower support bracket 18 is intended to remain clamped to the frame during use and during collisions. Recesses 74 and 76 are provided in the walls of the central passage 68. These recesses have center lines that are parallel to the axis 75 of the central passage 68 and that are 180° apart. Both recesses extend from the rearward facing surface 64 to an energy absorbing strap anchor surface 78. The anchor surface 78 is about ⅔ of the distance from the rearward facing surface 64 to the forward facing surface 66. Radially inner wall sections 80 and 82 form pockets 84 and 86 at each end of the anchor surfaces 78 and between the walls sections 80 and 82 and the radially outer walls of the recesses 74 and 76.

The energy absorbing straps 88 are J-strap members formed from steel sheets. Each strap 88 has a bight portion 90, a long leg 92 on one side of the bight portion and a short leg 94 on the other side of the bight portion. The short leg 94 ends in a wide bar section 96 that is wider than other parts of each strap 88. The wide bar section 96 constitutes an anchor end of the energy absorbing strap 88. Anchor contact surfaces 97 opposite the free edge 98 of the wide section 96 of each energy absorption strap 88 contact the energy absorbing strap anchor surface 78 of the recess 74 or 76. Ends of the wide section 96 are received in the pockets 84 and 86. The bight portion 90 is adjacent to the forward facing surface 66. The long leg 92 of each energy absorbing strap 88 is positioned radially inward from the short leg 94 and extends out of the central passage 68 and past the rearward facing surface 64.

The lower bearing adapter 100 has a cylindrical sleeve 101 with an upper end 102 and a lower end 104. The lower steering shaft bearing 99 is axially positioned by a transverse surface of a transverse wall 106 and is radially positioned by ribs 108 that are integral with the sleeve 101 and the transverse wall. Nubs 110 on some of the ribs 108 axially retain the lower bearing 99 and keep the lower bearing from moving axially away from the transverse wall 106. The transverse wall 106, the ribs 108 and the nubs 110 cooperate to form a bearing pocket 112.

The cylindrical sleeve 101 is telescopically received in the lower jacket end 114 of the jacket 12. Arcuate slots 116, on the lower end 104 of the lower bearing adapter 100, receive the lower jacket end 114. Jacket retainers 118 snap into apertures 120 in the jacket 12 to hold the lower end 114 in the slots 116. A plurality of axial fingers 122 of the lower bearing adapter 100 cooperate with cylindrical outer surfaces 124 of the cylindrical portion 101 of the bearing adapter 100 to form slots 126. The slots 126 also receive the lower end 114 of the jacket 12. Bight forming surfaces 128 are formed on the lower end 104 of the cylindrical portion 101. Long leg passages 129, that receive the long legs 92 of the energy absorbing straps 88, are formed by channel members 130 and the inside of the cylindrical sleeve 101. A steering shaft passage 132 is provided through the center of the transverse wall 106.

A sensor retainer 134 is a cup shaped member with a cylindrical wall 136 and an end wall 138. The end wall 138 has a central steering shaft passage 140. A sensor connector opening 142 is provided in the cylindrical wall 136. Three prongs 144 with sensor hooks 146 engage a sensor 148 and hold the sensor in the sensor retainer 134. Three bearing adapter prongs 150 are integral with the end wall 138 of the sensor retainer 134. These prongs 150 snap over and engage the radial flange 152 on the lower bearing adapter 100 between axial fingers 122. A support bracket engaging stop bar 154 is integral with the cylindrical wall 136 and extends rearward from the end wall 138. A rubber boot retainer flange 156 extends radially outward from the cylindrical wall 136. A rubber boot 158 telescopically receives the cylindrical wall 136 and is held in place by the boot retainer flange 156.

During assembly of the steering column lower bracket assembly, the long legs 92 of the two J-shaped energy absorbing straps 88 are each inserted into one of the long leg passages 129 with the short legs 94 positioned radially outward from the long legs. The long legs 92 enter the passages 129 near the lower end 104 of the bearing adapter 100 and are moved toward the upper end 102 until the bight portion 90 engages the bight forming surface 128. The free ends of the long legs 92, when the energy absorbing straps 88 are new, extend out of the upper end 102 of the bearing adapter 100, in excess of one-half the length of the long legs.

The lower bearing adapter 100 is slid into the central passage 68 of the lower support bracket 18 from the side of the support bracket with the rearward facing surface 64. The short legs 94 are aligned with the recesses 74 and 76. The wide bar section 96 of each energy absorbing strap 88 enters pockets 84 and 86 and the anchor contact surfaces 97 of each strap contact the energy absorbing strap anchor surface 78. Contact with the energy absorbing strap anchor surface 78 by the anchor contact surfaces 97 of a strap 88 stops movement of the energy absorbing strap relative to the lower column support bracket 18. Forward and downward movement of the lower bearing adapter 100, relative to the column support bracket 18, is stopped by contact between the bight forming surface 128 and the bight portion 90 of the energy absorbing strap 88 during assembly. Finger outer surfaces 160 on the axial fingers 122 of the lower bearing adapter 100 contact the walls of the central passage 68 of the lower support bracket 18 and radially center the lower bearing adapter within the support bracket. The long leg passages 129 formed by the channel members 130 prevent the long legs 92 of the energy absorbing straps 88 from contacting the intermediate steering shaft 46 and making objectionable noise.

The sensor retainer 134 is pressed into locking engagement with the lower bearing adapter 100 and locked in place by the bearing adapter prongs 150 that engage the radial flange 152. The lower column support bracket 18 is thereby captured between the support bracket engaging stop bar 154 and the bight portion 90 of the energy absorbing strap 88.

Assembly is completed by sliding the intermediate steering shaft 46 through the steering shaft passage 132, the lower steering shaft bearing 99 and the sensor retainer 134. At the same time the steering shaft 46 is inserted into the lower bearing adapter 100, the lower jacket end 114 telescopically receives the cylindrical sleeve 101, moves into the slots 126 and is seated in the arcuate slots 116 and the jacket retainer 118 snaps into the apertures 120 in the upper column jacket 12 thereby locking the jacket to the lower bearing adapter 100.

During a collision, the upper column support bracket 16 is forced to separate from a vehicle frame and the lower column support bracket 18 remains fixed to the frame. The upper column jacket 12 and the lower bearing adapter 100 move forward through the central passage 68 through the lower column support bracket 18. The lower bearing adapter 100 can move completely out of the forward end of the central passage 68 to a position in which the upper jacket 12 engages the walls of the central passage. The energy absorption straps 88 are bent into the U-shaped bight 88 and then straightened as the long legs 92 pass around the bight forming surfaces 128 and absorb energy.

The disclosed embodiments are representative of presently preferred forms of the invention, but are intended to be illustrative rather than definitive thereof. The invention is defined in the claims.

What is claimed is:

1. A steering column lower bracket assembly comprising:
   a lower bearing adapter with a bearing pocket, a steering shaft passage, a first bight forming surface and an adapter radially outward facing surface;
   a steering column jacket in engagement with the lower bearing adapter;
   a lower column support bracket including a central passage that cooperates with the adapter radially outward facing surface, telescopically receives the lower bearing adapter through a central passage upper end, and limits radial movement of the lower bearing adapter relative to the central passage; and a first energy absorbing strap with a first strap anchor end anchored to the lower column support bracket, a bight portion in engagement with the first bight forming surface and wherein the energy absorbing strap resists axial movement, to the front, of the lower bearing adapter relative to the central passage through the lower column support bracket.

2. A steering column lower bracket assembly, as set forth in claim 1, wherein the lower bearing adapter includes a second bight forming surface; and a second energy absorbing strap with a second strap anchor end anchored to the lower column support bracket, a second strap bight portion engaging the second bight forming surface and wherein the second energy absorbing strap resists axial movement to the front of the lower bearing adapter relative to the central passage through the lower column support bracket.

3. A steering column lower bracket assembly, as set forth in claim 2, wherein the first and second energy absorbing straps absorb energy and permit the lower bearing adapter to move forward in response to force exerted on the lower bearing adapter by the steering column jacket during a collision.

4. A steering column lower bracket assembly, as set forth in claim 2, wherein the lower bearing adapter includes a first long leg passage that is to one side of the steering shaft passage and a second long leg passage that is to another side of the steering shaft passage, and wherein the first long leg passage receives a first energy absorbing strap long leg and the second long leg passage receives a second energy absorbing strap long leg.

5. A steering column lower bracket assembly, as set forth in claim 1, wherein the steering column jacket is locked to the lower bearing adapter.

6. A steering column lower bracket assembly, as set forth in claim 1, including a sensor retainer that is attached to a lower end of the lower bearing adapter and wherein the sensor retainer includes a stop bar that limits rearward axial movement of the lower bearing adapter relative to the lower column support bracket.

7. A steering column lower bracket assembly, as set forth in claim 1, wherein the lower bearing adapter includes a long leg passage, that is to one side of the steering shaft passage, and receives a portion of a long leg of the first energy absorbing strap.

8. A steering column lower bracket assembly comprising:

a lower bearing adapter with a bearing pocket, a steering shaft passage, a first bight forming surface, a second bight forming surface and an adapter radially outward facing surface;

a lower column support bracket including a central passage that cooperates with the adapter radially outward facing surface, telescopically receives the lower bearing adapter through a central passage upper end, and limits radial movement of the lower bearing adapter relative to the central passage;

a first energy absorbing strap with a first strap anchor end anchored to the lower column support bracket, a first strap bight portion in engagement with the first bight forming surface and wherein the first energy absorbing strap resists axial movement, to the front, of the lower bearing adapter relative to the central passage through the lower column support bracket; and a second energy absorbing strap with a second strap anchor end anchored to the lower column support bracket, a second strap bight portion in engagement with the second bight forming surface and wherein the second energy absorbing strap resists axial movement, to the front, of the lower bearing adapter relative to the central passage through the lower column support bracket.

9. A steering column lower bracket assembly, as set forth in claim 8, including a jacket in engagement with the lower bearing adapter and wherein the first and second energy absorbing straps and the lower bearing adapter resist forward movement of the jacket relative to the lower column support bracket.

10. A steering column lower bracket assembly, as set forth in claim 9, including at least one mechanical fastener that connects the jacket to the lower bearing adapter.

11. A steering column lower bracket assembly, as set forth in claim 10, wherein the at least one mechanical faster is a non-threaded fastener.

12. A steering column lower bracket assembly, as set forth in claim 8, including a sensor retainer connected to the lower bearing adapter by at least one mechanical fastener and wherein the sensor retainer limits rearward movement of the lower bearing adapter relative to the lower column support bracket.

13. A steering column lower bracket assembly, as set forth in claim 12, wherein the at least one mechanical fastener is a non-threaded mechanical fastener.

14. A method of assembling a steering column lower bracket assembly comprising:

mounting a pair of energy absorbing J-straps on a lower bearing adapter with a bight portion of each energy absorbing J-strap in engagement with a bight forming surface on the lower bearing adapter;

sliding the lower bearing adapter into an upper end of a central passage through a lower column support bracket until a strap anchor surface on each of the energy absorbing J-straps contacts a pocket end wall in the lower column support bracket and resists further forward movement of the lower bearing adapter relative to the lower column support bracket; and attaching a sensor retainer to the lower bearing adapter such that the sensor retainer limits rearward movement of the lower bearing adapter relative to the lower column support bracket with the energy absorbing J-straps held energy absorbing positions.

15. A method of assembling a steering column lower bracket assembly, as set forth in claim 14, including:

inserting a steering column jacket into the lower bearing adapter until at leas one non-threaded fastener snaps into a locking position and locks the steering column jacket to the lower bearing adapter.

16. A method of assembling a steering column lower bracket assembly, as set forth in claim 14, wherein the sensor retainer is attached to the lower bearing adapter by moving the sensor retainer and the lower bearing adapter toward each other until a non-threaded fastener snaps into a locking position and locks the sensor retainer to the lower bearing adapter.

17. A steering column assembly comprising:

a lower bearing adapter with a sleeve portion having an upper sleeve end, a lower sleeve end, a steering shaft passage through the sleeve portion and extending from the upper sleeve end to the lower sleeve end, at least one finger with a lower finger end integral with the sleeve portion and an upper finger end, a jacket receiving slot between the sleeve portion and the at least one finger, and a first bight forming surface, on the lower bearing adapter, that faces forward;

a steering column jacket with a lower jacket end received in the jacket receiving slot and having a lower jacket end surface in engagement with a jacket receiving slot end wall;

a lower column support bracket including a central passage with a central passage forward end and a central passage rear end and wherein the lower bearing adapter is telescopically received in the central passage rear end with the at least one finger in engagement with an interior surface of the central passage and between the interior surface and the steering column jacket; and a first energy absorption strap with a first strap anchor end received in a first recess in the interior surface of the central passage and in engagement with a first pocket bottom wall in a first recess lower end.

18. A steering column assembly, as set forth in claim 17 including a second energy absorption strap with a second strap anchor end received in a second recess in the interior surface of the central passage and in engagement with a second pocket bottom wall in a second recess lower end.

19. A steering column assembly, as set forth in claim 17, including a non-threaded jacket retainer that snaps into a locked position when the lower jacket end is fully inserted into the jacket receiving slot and locks the lower bearing adapter to the steering column jacket.

20. A steering column assembly, as set forth in claim 17 including a sensor retainer attached to the lower sleeve end of the lower bearing adapter by a mechanical fastener and wherein the sensor retainer includes a stop bar that contacts the lower column support bracket to limit rearward movement of the lower bearing adapter relative to the lower column support bracket.

21. A steering column assembly, as set forth in claim 20 wherein the mechanical fastener includes at least one prong that snaps into a locked position when the sensor retainer is moved into engagement with the lower sleeve end of the lower bearing adapter and locks the sensor retainer to the lower bearing adapter.

22. A steering column assembly, as set forth in claim 17, wherein the lower bearing adapter includes a bearing pocket in the steering shaft passage through the sleeve portion.

23. A steering column lower bracket assembly comprising:

a lower bearing adapter with a bearing pocket, a steering shaft passage and a first bight forming surface;

a steering column jacket in engagement with the lower bearing adapter;

a lower column support bracket including a central passage that telescopically receives the lower bearing adapter and limits radial movement of the lower bearing adapter relative to the central passage;

a first energy absorbing strap with a first strap anchor end anchored to the lower column support bracket, a bight portion in engagement with the first bight forming surface and wherein the energy absorbing strap resists axial movement, to the front, of the lower bearing adapter relative to the central passage through the lower column support bracket; and a sensor retainer that is attached to a lower end of the lower bearing adapter and wherein the sensor retainer includes a stop bar that limits rearward axial movement of the lower bearing adapter relative to the lower column support bracket.

24. A steering column lower bracket assembly comprising:

a lower bearing adapter with a bearing pocket, a steering shaft passage, a first bight forming surface, and a second bight forming surface;

a lower column support bracket including a central passage that telescopically receives the lower bearing adapter and limits radial movement of the lower bearing adapter relative to the central passage;

a first energy absorbing strap with a first strap anchor end anchored to the lower column support bracket, a first strap bight portion in engagement with the first bight forming surface and wherein the first energy absorbing strap resists axial movement, to the front, of the lower bearing adapter relative to the central passage through the lower column support bracket;

a second energy absorbing strap with a second strap anchor end anchored to the lower column support bracket, a second strap bight portion in engagement with the second bight forming surface and wherein the second energy absorbing strap resists axial movement, to the front, of the lower bearing adapter relative to the central passage through the lower column support bracket; and a sensor retainer connected to the lower bearing adapter by at least one mechanical fastener and wherein the sensor retainer limits rearward movement of the lower bearing adapter relative to the lower column support bracket.

25. A steering column lower bracket assembly, as set forth in claim 24, wherein the at least one mechanical fastener is a non-threaded mechanical fastener.

26. A steering column lower bracket assembly comprising:

a lower bearing adapter with a bearing pocket, a steering shaft passage and a first bight forming surface;

a steering column jacket in engagement with the lower bearing adapter;

a lower column support bracket including a central passage that telescopically receives the lower bearing adapter and limits radial movement of the lower bearing adapter relative to the central passage;

a first energy absorbing strap with a first strap anchor end anchored to the lower column support bracket, a bight portion in engagement with the first bight forming surface and wherein the energy absorbing strap resists axial movement, to the front, of the lower bearing adapter relative to the central passage through the lower column support bracket; and a retainer attached to a lower end of the lower bearing adapter and wherein the retainer includes a stop bar that limits rearward axial movement of the lower bearing adapter relative to the lower column support bracket.

\* \* \* \* \*